United States Patent [19]

Wroclawsky

[11] Patent Number: 5,197,931
[45] Date of Patent: Mar. 30, 1993

[54] EXERCISE APPARATUS

[76] Inventor: Solomon Wroclawsky, 1393 Newport #4, Long Beach, Calif. 90804

[21] Appl. No.: 767,046

[22] Filed: Sep. 27, 1991

Related U.S. Application Data

[63] Continuation-in-part of Ser. No. 678,673, Apr. 1, 1991, abandoned.

[51] Int. Cl.[5] .............................................. A63B 71/00
[52] U.S. Cl. ...................................... 482/74; 482/68; 482/121
[58] Field of Search .................... 280/1.5, 214, 216; 482/51, 121, 14, 57, 62, 66, 68, 74, 129, 148

[56]  References Cited
U.S. PATENT DOCUMENTS

| | | | |
|---|---|---|---|
| 4,334,677 | 6/1982 | Tata | 482/74 |
| 4,469,324 | 9/1984 | Dolan | 482/74 |
| 4,813,664 | 3/1989 | Vroulis | 482/68 |

FOREIGN PATENT DOCUMENTS 1461930  1/1977  United Kingdom ................. 280/1.5

Primary Examiner—Richard J. Apley
Assistant Examiner—J. Donnelly
Attorney, Agent, or Firm—Flehr, Hohbach, Test, Albritton & Herbert

[57]  ABSTRACT

An exercise device for working both the arms and legs simultaneously when desired, as when a boxer shadow boxes during road work, includes a wheeled frame arranged as a trailer. Elastic straps stretched from the frame engaging the legs just above the knees and a pair of elastic straps grasped by the hands are worked in running and punching motions. The reaction from the elastic stretching is passed via an articulated abutment on the frame to the user's upper legs. In another form, a cushioned abutment is coupled to the user by a waist belt assembly.

11 Claims, 5 Drawing Sheets

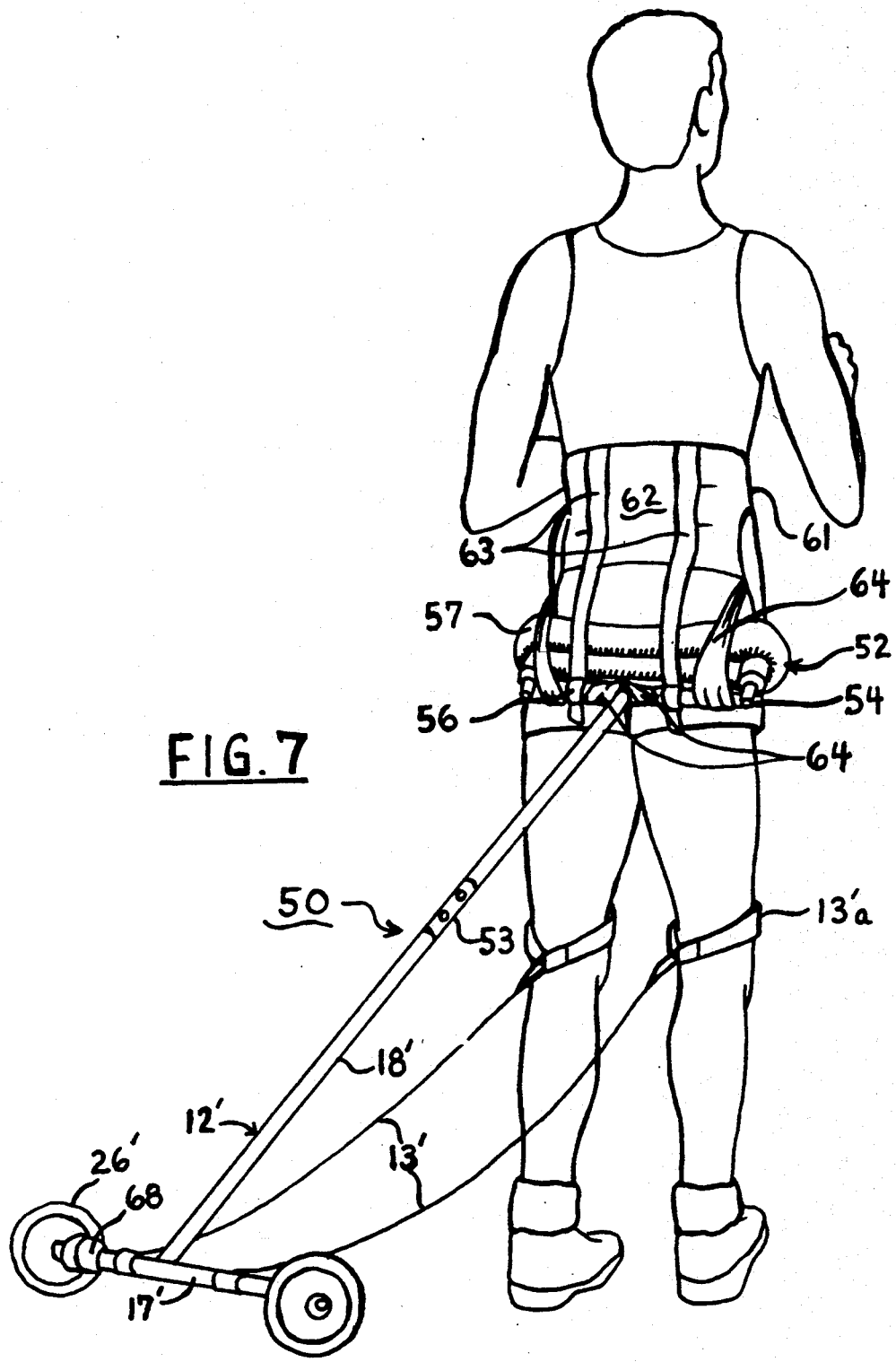

EXERCISE APPARATUS

This is a continuation-in-part of patent application Ser. No. 07/678,673, filed on Apr. 1, 1991, entitled EXERCISE APPARATUS, in the name of Solomon Wroclawsky.

BACKGROUND OF THE INVENTION

1. Field of the Invention

This invention relates generally to the field of apparatus for exercising the human body. More particularly, the invention relates to an improved apparatus for exercising against an elastomeric resistance and thereby strengthening both the arms of the upper body and the legs of the lower body so that the user obtains the benefit of a substantially full body workout.

2. Description of the Prior Art

The field of human exercise has received substantial attention in the last decade as evidenced by the President's Council on Physical Fitness proclaiming that it is generally healthful that all of our people from childhood through elder adults obtain physical exercise on a regular basis. Outdoor exercise is generally recognized as the most desirable. However, a large segment of the population is unable to exercise out of doors year around or prefer to exercise indoors for reasons of climate, personal convenience, shyness, etc. Body builders, gymnasts and boxers exercise indoors commonly in facilities equipped with fixed in place exercise machines, including those for the exercise of the legs, sold under the trademark, Stair Master, as well as the numerous variable resistance machines as typified by the Nautilus equipment. Because of the expense, size and complexity of this exercise equipment, it is used at exercise centers, such as health clubs, gyms and the like. For equipment of this type to be brought into a living space or home, it would occupy a substantial area unless it could be readily disassembled and put away, yet be available for reassembly and use.

The prior art has recognized the benefits of simulating indoors the benefits of an exercise usually conducted out of doors, such as the cross-country skiing simulator as disclosed in the Norton U.S. Pat. No. 4,434,981; the running on stadium stairs for strengthening the legs and increasing cardiac output is simulated to a degree by the Wilkinson U.S. Pat. No. 4,340,218. Stationary bicycles are used by many people for exercising indoors.

Rehabilitation or strengthening various leg joints of the body through use of elastomeric or spring resistance appears in the art such as the Segal U.S. Pat. No. 4,606,542 for exercising the leg or arm, the Hartzell U.S. Pat. No. 4,371,162 which simulates the weight lifters squats exercise and the portable quadracepts muscles exerciser of the Reese U.S. Pat. No. 4,466,613.

Recent activity in the field of sports medicine has been quite intense as regards the development of exercise devices where many advancements are based on stringent scientific and medical considerations. Although exercise devices and related equipment have been produced on sound principles of kinesiology, very few have found application for boxers where the arm and fist movements are made forcefully as the boxer moves his legs. In this field, the development of the legs, as well as the arms, is important and boxers for many years increased their aerobic capacity by attention to a regimen of four to six mile daily running workouts while shadow boxing at frequent intervals. There is a need for an improved exercise device which is capable of affording boxers, as well as other athletes including runners and bicyclists, a vehicle for exercise of the legs, abdomen, stomach, arms and chest, ideally substantially within the same workout interval and with the same equipment.

SUMMARY OF THE INVENTION

It is an object of the present invention to provide an improved exercising device for exercising the arms and legs using shadow boxing and running movements.

It is another object of the invention to provide an improved exercising device wherein the user may exercise the legs independently of exercising the arms, and vice versa.

It is further object of the invention to provide an improved exercising device which is capable of exercising the upper body and the lower body.

It is yet another object of the invention to provide an exercising device which may be used indoors or outdoors and wherein the device is extremely simple to use, efficient in operation and which may be easily disassembled for storage and which is easy to erect for use in exercising.

These and other objects of the invention are realized by providing an exercise apparatus which includes a frame which is positioned as a trailer to the user and has arranged thereon a harness of elastomeric elements yieldable to resist motions of the arms and legs. An abutment member on the frame engages the user's legs in the upper region thereof below the butt and strut means connects the abutment member to a base equipped with wheels for facilitating movement over the ground. The harness includes a first pair of elements extending for engaging with the user's legs and mountable thereto in the region just above the knee so that in a running motion the legs will alternately stretch first one and then the other of the pair of elastomeric elements. A second pair of elastomeric elements is arranged for engagement with the user's hands in such a manner that in a fist punching action the arms will alternately stretch first one and then the other of the elastomeric, yieldable elements. Other objects, advantages and features of the invention become apparent from the following detailed description of the preferred embodiment, reference being made to the accompanying drawings.

BRIEF DESCRIPTION OF THE DRAWINGS

FIG. 7 is a rear elevational view of the exercise apparatus shown in FIG. 6.

DETAILED DESCRIPTION OF THE PREFERRED EMBODIMENTS

Figure 1:
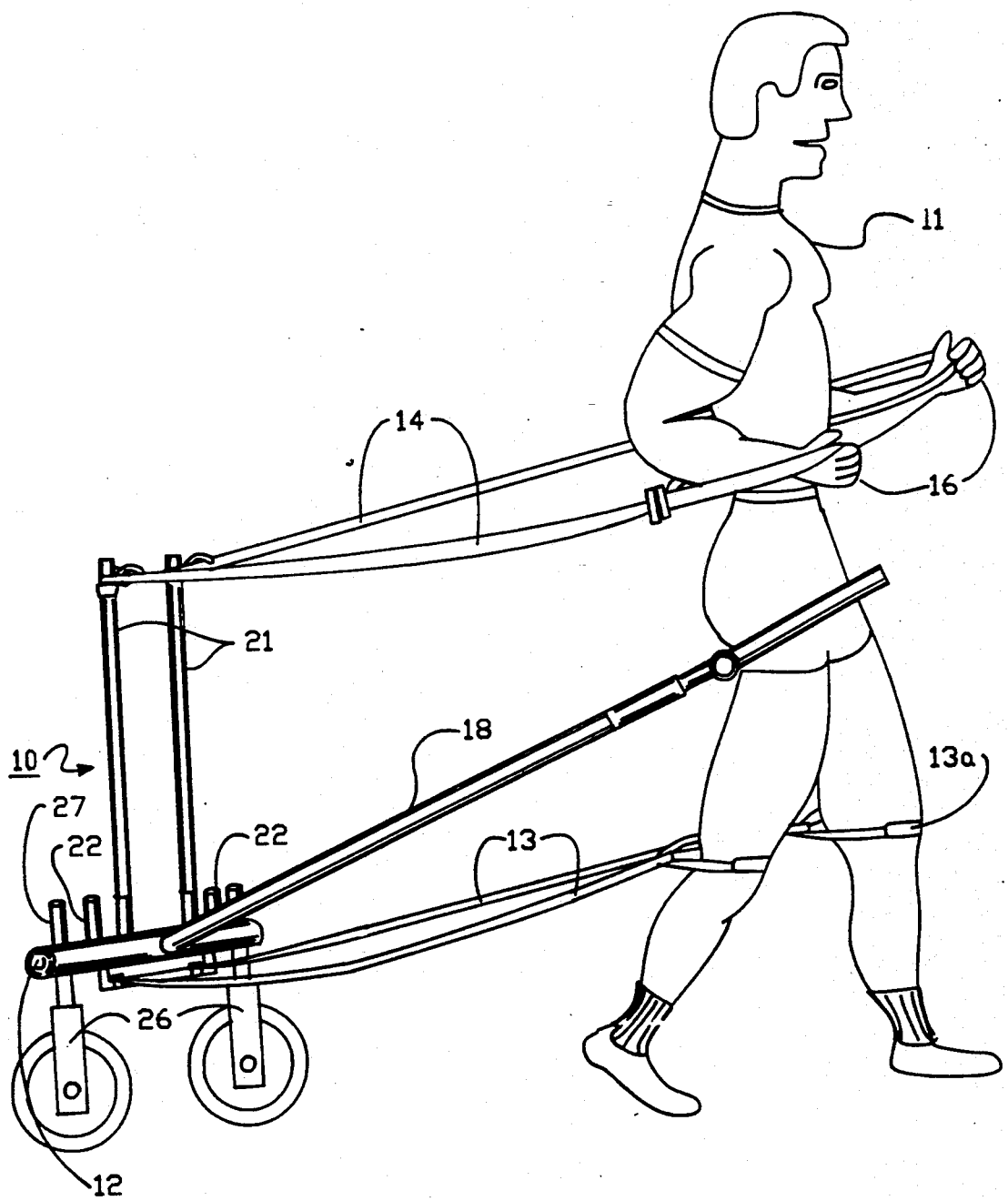
FIG. 1 is an elevational view of an exercise device according to the invention shown in use.

The highly portable exercise apparatus 10 of the present invention is shown in FIG. 1 of the drawings associated with a user 11 of the generally masculine gender, although the apparatus is equally adoptable for use by women. The apparatus 10 includes a frame 12 arranged in a trailing relationship to the user 11 and two pair elastomeric elements 13 and 14, which comprise a harness, with a lower pair 13 arranged for engagement with the legs and an upper pair 14 disposed for use or engagement by the hands 16 of the individual user 11.

Figure 2:
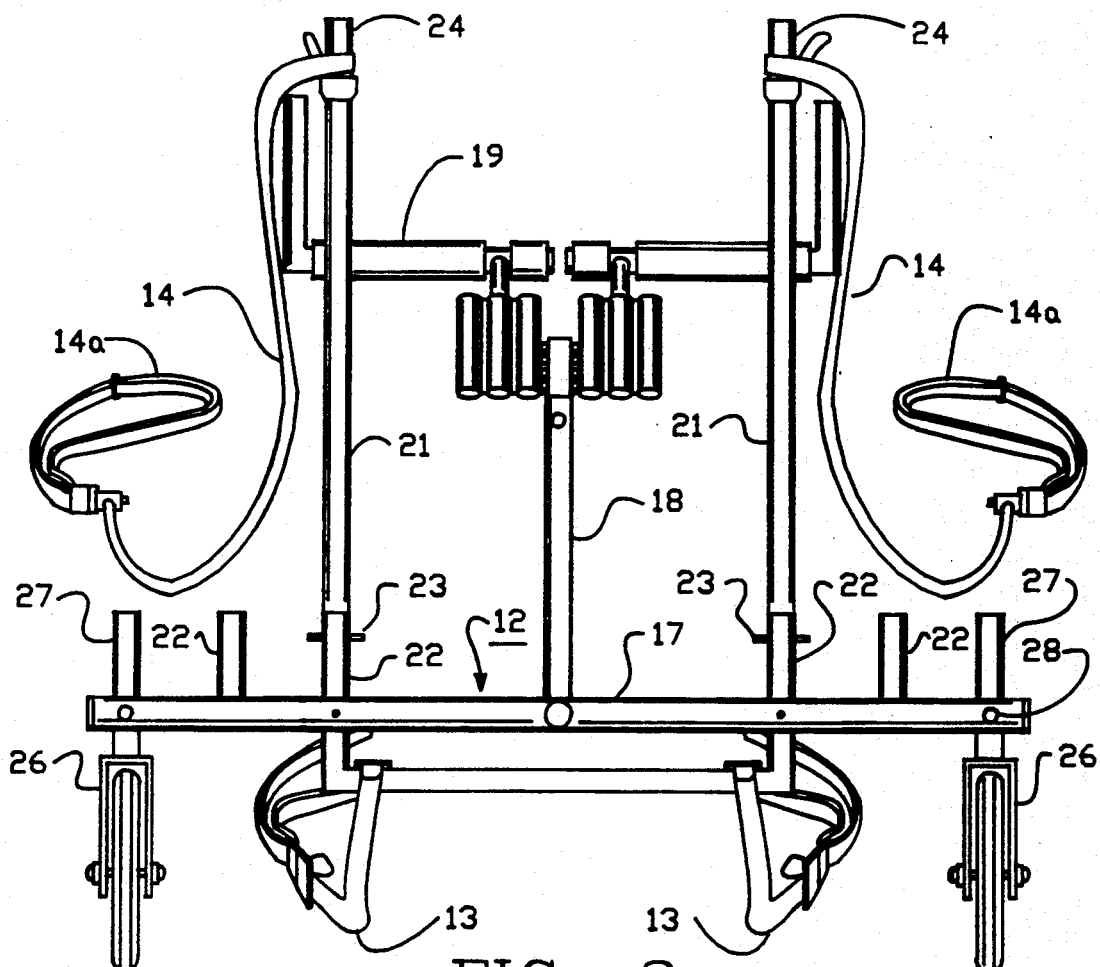
FIG. 2 is a rear elevational view of the exercise device shown in FIG. 1.

Referring now to FIGS. 1 and 2, the frame 12 may conveniently be constructed of metal tubing which provides an excellent strength to weight relationship as well as smoothness in appearance and ease of manufacture. The frame 12 includes a transversely extending base 17, a strut 18 and an abutment assembly 19 resiliently mounted on the strut 18. As may be seen in FIG. 1, the abutment 19 engages the user's body in the upper leg portion and just below the butt.

The frame also includes upstanding tubular stanchions 21 removably mounted on the base 17 and projecting upwardly therefrom to a height for attachment of the hand engaging elastomeric elements 14 as shown in FIG. 2 at a level such that in the stretching action the movement will be substantially linear with little rotational torque applied in the stretching of the elastomeric members 14. The stanchions 21 may be formed from two or more telescoping members (not shown) or from a single tube as shown.

The base 17 is provided with a plurality of upstanding socket members 22 for receipt of the lower end of the stanchions 21 to be held therein by the pins 23. The base 17 includes a sub-frame or cartridge 24 disposed generally parallel to the base 17 and coupled thereto by quick release fasteners 25 and having metal buckle elements 29 which serve to establish the attachment points for the leg engaging elastomeric elements 13 which are threaded through the buckles 29.

The base 17 at each end is equipped with a wheel assembly 26 mounted on an upwardly extending shaft 27 which is coupled to the base 17 by a pin 28 for easy assembly and disassembly of the wheels with respect to the frame base. The provision of the wheels permits the exercise apparatus 10 to be used outdoors, such along a running track, sidewalk or roadway when the user 11 wishes to obtain the benefit of running against a selected resistance.

Figure 3:
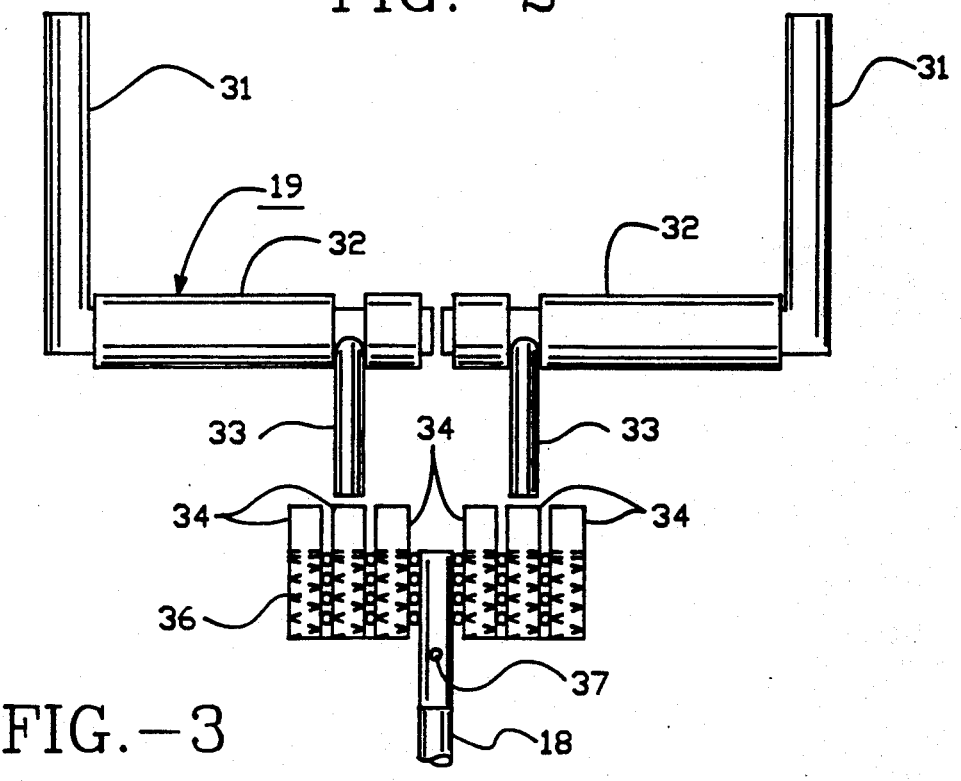
FIG. 3 is an enlarged, fragmentary exploded view of the abutment member of the present invention.

The body abutment assembly 19, shown in FIG. 3, has a general U-shape configuration with the side handle-like members 31 extending forwardly from a cushioned cross-member 32 which engages the user's body to take the reaction forces from stretching the elastomeric elements 13 and 14. Because those elements are used alternately, it is desirable the abutment 14 accommodate the alternate reaction thrusting or rotational movement of the user's body and to this end each cross-member 32 is provided with a plunger 33 which is received in a tubular encasement 34 having a spring therein so that either the left side or right side half of the abutment may articulate as the user's body urges the abutment half rearwardly against the bias of the spring 36 in the member 34. The spring 36 has a compression value of about two pounds.

Providing for adjustability between the span of the handle-like members 31, a number of encasement members 34 are arranged laterally spaced apart with respect to the strut 18 and by selection of the appropriate set of members for receipt of the plungers 33, different widths are available for different body types. The abutment assembly 19 is coupled to the strut 18 by the pin and socket assembly 37 illustrated in FIG. 3. To maintain the abutment at the optimum position against the user's body, a suspender strap 38 may serve connected to the frame, abutment or strut, and looped around the waist, like a belt.

The elastomeric elements 13, 14 may be selected from various materials including bungie cords, bicycle tire inner tubes, rubber straps and the like and mounted to the frame and stanchion by a knot or by a fastener if desired. The yieldable elastomeric resistance provided by the pair of hand stretching members has been found most effective in the range of from 7 to 12 pounds of elastomeric tension. For the pair elongate elastomeric members engageable by the legs an effective range has been found to be 8 to 14 pounds.

The upper elastomeric members 14 may be equipped with an adjustable strap 14a for easy insertion of the hand. The anchor point at the top ends of the stanchions may have the members 14 wound in several layers so as to effectively shorten members 14 for increased resilient tension.

Figure 4:
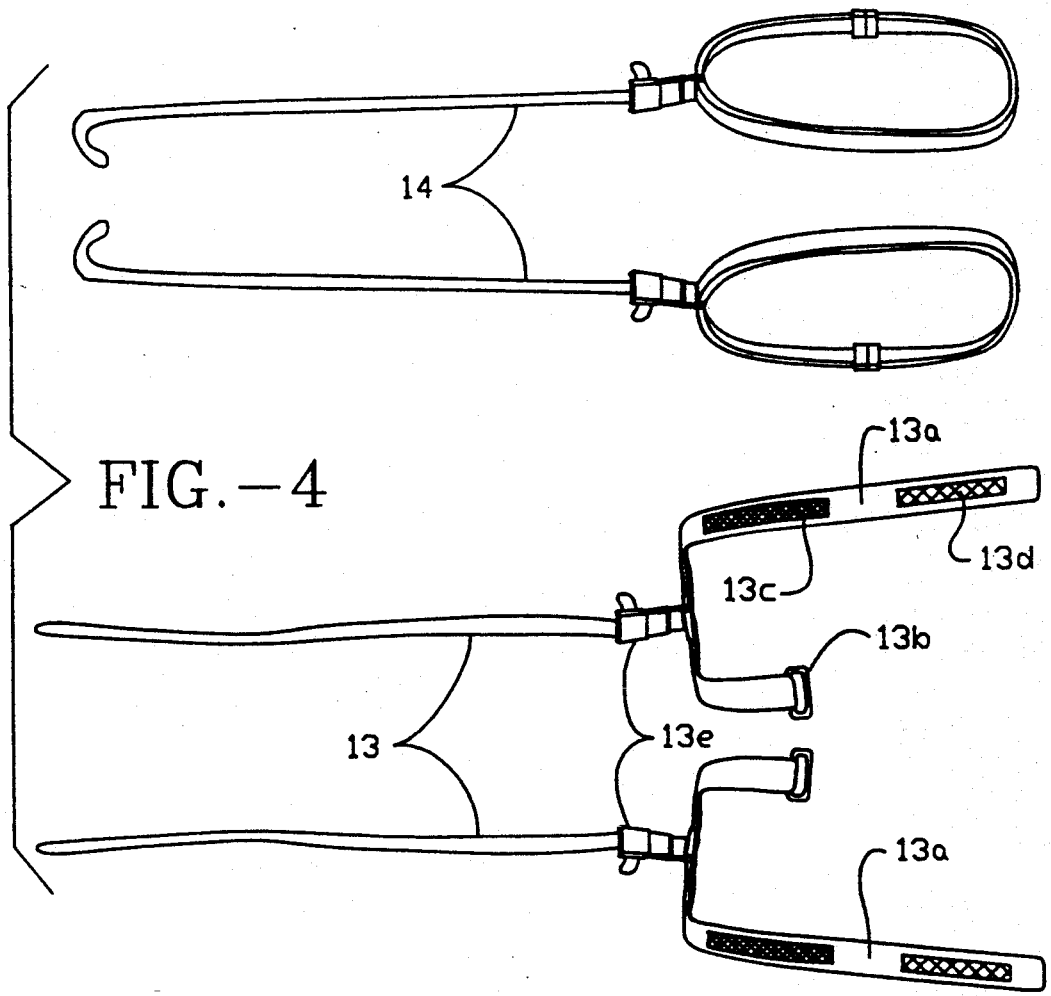
FIG. 4 is a view of the two pair of the elongated, elastomeric means included in the present invention.
Figure 5:
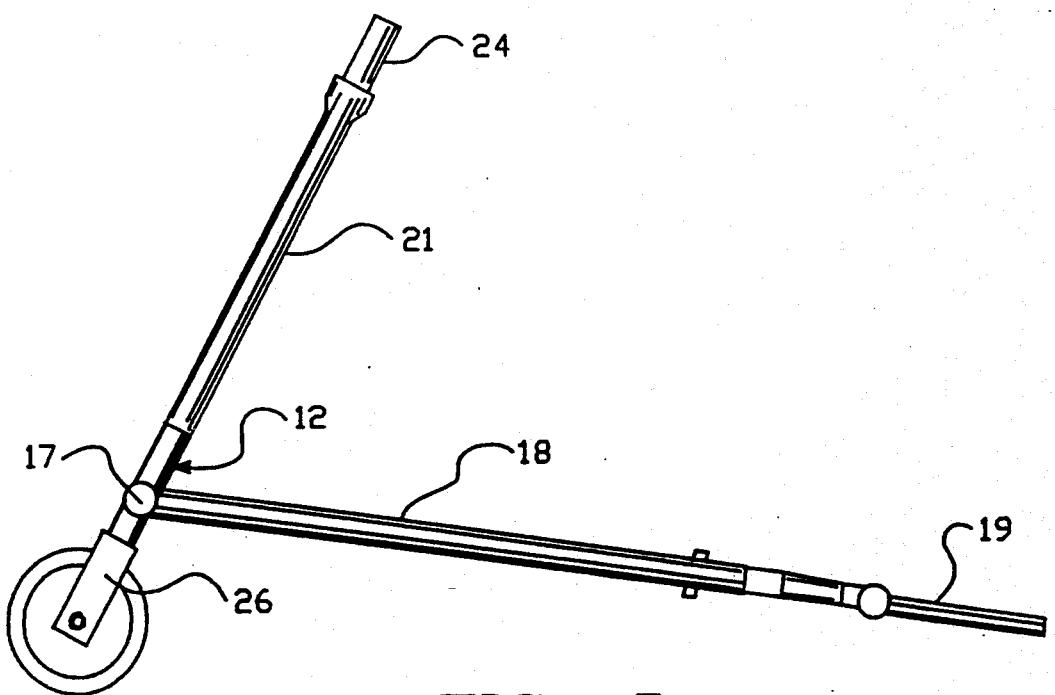
FIG. 5 is a side elevational view of the exercise apparatus of FIG. 1 shown without the elongated elastomeric means.

The pair of elastomeric elements 13 for exercising the legs, referring to FIG. 4, may be equipped with a strap assembly 13a including a D-ring 13b and a hook and loop fabric assembly 13c and 13d for easy mounting and dismounting from the user's leg. The assembly 13a may be coupled to the elastomeric member by an adjustment buckle 13e well known in the field.

It is contemplated that the strut 18 may be made up of several interrelated telescoping elements so that the length of the strut may be extended or retracted as the user selects for running outdoors or for running action indoors, such as in an apartment.

In use, the user assembles the exercise apparatus 10 by mounting the abutment assembly portion in the appropriate socket elements 34 to suit the width of the user's body in the hip area. The abutment is then mounted to the strut 18 with the pin coupling which in turn is coupled to the frame base 17. The user also selects the span between the upright stanchions 21 by mounting them in the selected pair of sockets 22, again to accommodate the circumstance whether the user is broad bodied, thus having his arms space wide apart, or of a narrower frame with arms arranged closer together. The wheels are mounted to the base with a pin connection and the elastomeric strap element mounted as shown. Should the user wish more or less tension in the straps, it is facile to wrap or unwrap the straps around the associated mounting element, base or stanchion. With the strap members 13a encircling the leg just above the knee as is most comfortable, the user is ready to commence exercising using the device 10. The lengths of the elastomeric elements 13, 14 are selected to remain in tension when the user's arm or leg is in the rearward position. Although for purposes of illustration in FIG. 1 the member associated with the retracted limb may appear to be a bit slack, this is not the case in actual use.

In a running action, the stretching of the lower strap 13 produces a reaction force from the body against the abutment member 19. When, for example, the right leg is extended forward, the reactive pressure will be against the left-hand side of the abutment 19 causing the plunger 33 to be depressed against the bias of the spring 36 within the encasement socket 34. Conversely, when the left leg is extended the right-hand portion of the abutment member will receive the predominant reaction force causing the right-hand plunger to depress within the socket against the bias of the spring therein. When the pressure is released on a particular side of the abutment member, the spring urges the plunger outwardly.

Similarly, when the user stretches the upper pair of elastomeric elements in a punching motion, for example, the reaction force is translated through the stanchions 21 into the frame and into the abutment member 19. The abutment halves move as described above in the reaction to forces imparted through stretching of the elastomeric members 14.

It has been found in use that the exercise apparatus 10 can permit an excellent workout in a short period of time. Adjustment of the tension in the straps is easily made to accommodate the level of fitness or the level of difficulty desired in the workout. Both the upper body and lower body can be worked simultaneously and there is provided an apparatus which permits simulation of the punching action boxers use.

DESCRIPTION OF A SECOND PREFERRED EMBODIMENT

Figure 6:
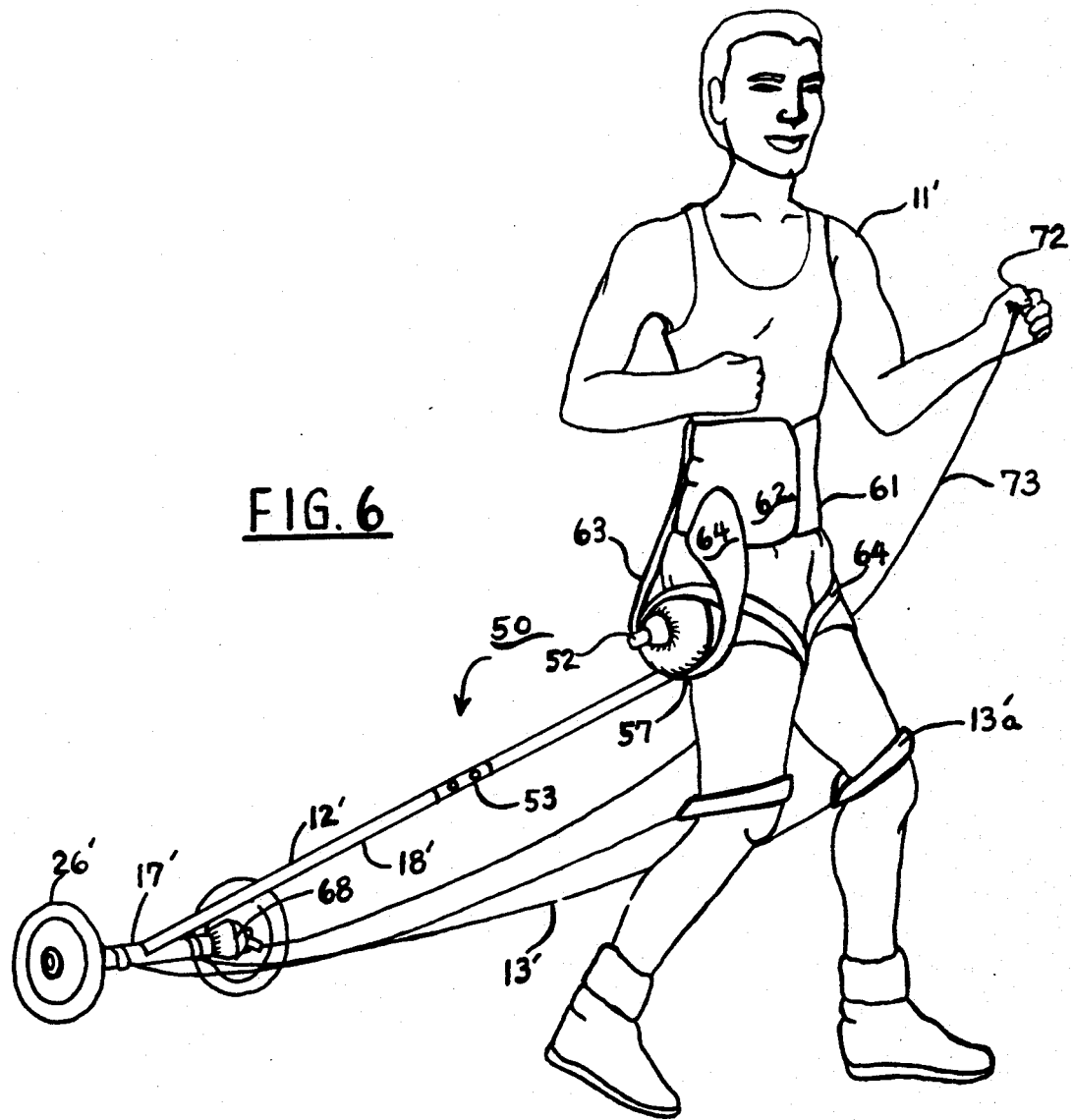
FIG. 6 is an elevational view of an exercise apparatus according to another form of the invention shown in use.

A second preferred embodiment 50 of the present invention is shown in FIGS. 6 and 7 and comprises a number of elements similar if not identical to those of the embodiment 10 and for this reason the same reference numerals are applied but using an additional "prime" symbol. Accordingly, the exercise apparatus 50 comprises a frame 12' arranged in an operative relationship to the user 11' and having connected thereto a pair of elastomeric strap elements 13' which comprises a harness arranged for engagement with the legs with a distal attachment strap 13a' encircling the leg just above the user's knee and as may be most comfortable to the user 11'. The frame 12' includes a transversely-extending base 11', a strut 18' and an abutment assembly 52 mounted on the strut 18'. As may be seen from FIGS. 6 and 7, the abutment assembly 52 engages the user's body at the upper leg portion or in the buttock's region.

The base 17' at each end is equipped with a wheel assembly 26' so that the exercise apparatus 50 may be used for exercising out-of-doors. The pair of elastomeric strap elements 13' are secured to the base 17 by any convenient arrangement such as buckles, hook-and-loop fastener strap assembly or by a simple knot. The strap element 13' may comprise bicycle tire inner tubes, sliced-apart radially.

The strut 18 may be formed in two sections telescopically coupled and having provisions such as a series of holes in the tubular sidewall to receive spring biased detents 53, positioned in the other tube element so that different lengths of the strut 18' can be selected.

The body abutment assembly 52 has a general U-shaped configuration with side handle-like members 54 extending forwardly from a cushion equipped cross-member 56, FIG. 7. A cushioning member 57 extends across the two spaced-apart handle elements 54 and the cushioning element 57 may be conveniently constructed from an inflatable tube such as an inner tube for a bicycle tire or the like.

Serving to maintain the exercise apparatus 50 in a comfortable relationship to the user 11', a belt and strap assembly 61 couples the user 11 to the abutment 52. More specifically, a broad waist-encircling soft fabric belt 62 wraps around the user's waist, the ends of the belt 62 being secured together by hook-and-loop fastener means (not shown). The fabric of the belt 62 is soft and pliable and is non-irritating to the user 11' during a workout. In back, the belt 62 is provided with two generally vertically-extended straps 63 which are connected at their lower ends to the cross-bar 56 in a spaced-apart relationship on either side of the strut 18'. The straps 63 may be connected to the belt 62 by stitching or by hook-and-loop fastener assembly.

A pair of strap-like wraps 64 are mounted at one end closely adjacent to the strut 18' on the cross-bar 56, FIG. 7. In use, the wrap-straps 64 are brought forwardly between the user's legs, as shown in FIG. 6, and are wrapped about the end portions of the cross-bar 56 to hold the cushion member 57 snugly in place. The ball or distal end of the wrap-strap 64 is secured to the waist belt 52 such as by a hook-and-loop assembly so that it may be readily attached and disconnected therefrom. It will be understood that the wrap belt 64 engage each end of the abutment assembly 52 so there is no unbalanced rocking relationship as the user 11' runs using the apparatus 50.

A transducer unit 68 is mounted in operative connection with the wheel assembly 26' on the left-hand side of the frame and contains means to measure the rotation of the wheel and thereby to calculate all the distance the user has traveled. Further, the unit 68 includes means to measure the rate of wheel rotation, thereby to furnish to the user information to a hand-held terminal 72 coupled by the wire 73 to the transducer 68 the information regarding speed and distance it has traveled. A program may be stored in the transducer to calculate the subject parameters as well as those giving the total usage the machine has experienced in a given period of time, or with reference to the amount of energy expended by the user in a given workout. Further, the transducer assembly 68 includes clock means as normally as included with computer chips delivering the foregoing functions.

It will be clear from the above where there has been described an improved apparatus which fulfills the purposes and objects of the invention, but it is to be understood that the form of the invention shown and described is to be taken as merely a preferred embodiment and various changes in shape, material size and arrangement of the parts may be resorted to without departing from the spirit of the invention of scope of the claims which follow.

What is claimed is:

1. An exercise apparatus comprising, a frame wherein rollable means are mounted to the frame in a ground engaging location to allow the device to be used as an interactive exercise trailing device when the use is mobile along a surface, and a harness of elastomeric elements secured to the frame, the frame being arranged to extend predominantly aft of the user's legs and including an abutment member serving to engage the user's legs in the upper region thereof, the frame including a base and strut means connecting the abutment member to the base in a spaced apart relationship, the harness including a first pair of elements mounted upon the frame and extending for engagement with the user's legs in a manner such that in a running motion the legs will alternately stretch first one and then the other of the pair of elastomeric elements, the harness including a second pair of elements mounted upon the frame and extending for engagement with the user's hands in a manner such that in a fist punching action the arms will alternately stretch first one and then the other of the second pair of elastomeric elements.

2. The apparatus of claim 1 wherein the frame further includes at least one upright member extending from the base and serving at the upper portions thereof as an attachment point for the second pair of elastomeric elements.

3. The apparatus of claim 1 wherein the rollable means are wheel means mounted on the frame permitting the apparatus to be used as a trailer as when the user is running along a surface.

4. The apparatus of claim 1 wherein the strut means includes means for varying the length thereof so as to space the abutment member closer or farther from the base member.

5. The apparatus of claim 1 wherein resilient coupling means are provided between the strut means and the abutment member serving to smooth the action of the user with respect to the apparatus.

6. The apparatus of claim 1 wherein said first pair of elastomeric elements is equipped at the leg engaging end thereof with a loop strap for encircling the user's leg, the loop strap including a readily releasable fastener means permitting easy mounting upon the user's legs.

7. An exercise apparatus comprising, a frame wherein rollable means are mounted to the frame in a ground engaging location to allow the device to be used as an interactive exercise trailing device when the use is mobile along a surface, and a harness of elastomeric elements secured to the frame, the frame being arranged to extend predominantly aft of the user's legs and including an abutment member serving to engage the user's legs in the upper region thereof, the frame including a base and strut means connecting the abutment member to the base in a spaced apart relationship, the harness including at least one pair of elements mounted upon the frame and extending for engagement with the user's legs in a manner such that in a running motion the legs will alternately stretch first one and then the other of the pair of elastomeric elements, and means for coupling said abutment member to the user and including a flexible member adapted to encircle the user's waist and having readily releasable fastener means thereon so that the flexible member may be quickly mounted and dismounted with respect to the user's body.

8. The exercise apparatus of claim 7 wherein said coupling means includes flexible means connecting the abutment member to the waist encircling flexible member.

9. The exercise apparatus of claim 7 wherein indicator means are operatively coupled to said rollable means serving to provide the user with information such as speed and distance data generated in the user's exercise.

10. The exercise apparatus of claim 7 wherein resilient cushioning means are mounted on the abutment member serving conformably to engage the user's legs during the motions of exercise.

11. An exercise apparatus comprising, a frame wherein rollable means are mounted to the frame in a ground engaging location to allow the device to be used as an interactive exercise trailing device when the use is mobile along a surface, and a harness of elastomeric elements secured to the frame, the frame being arranged to extend predominantly aft of the user's legs and including an abutment member service to engage the user's legs in the upper region thereof, the frame including a base and strut means connecting the abutment member to the base in a spaced apart relationship, the harness including at least one pair of elements mounted upon the frame and extending for engagement with the user's legs in a manner such that in a running motion the legs will alternately stretch first one and then the other of the pair of elastomeric elements, and means for coupling said abutment member to the user and including a flexible member adapted to encircle the user's waist and having readily releasable fastener means thereon so that the flexible member may be quickly mounted and dismounted with respect to the user's body, said coupling means including strap means connected at one end portion to the waist encircling flexible member and having a length sufficient to wrap around an end portion of the abutment member and to attach at another end portion to another location on said flexible member, and second fastener means on said last mentioned end portion serving to secure such end portion releasably to said flexible member. r

* * * * *